United States Patent [19]

Brusky et al.

[11] Patent Number: 4,904,749

[45] Date of Patent: Feb. 27, 1990

[54] PREPARATION OF PHEMA BY PRECIPITATION/SUSPENSION POLYMERIZATION

[75] Inventors: Phyllis L. Brusky; Richard A. Markle, both of Columbus, Ohio

[73] Assignee: Marion Laboratories, Inc., Kansas City, Mo.

[21] Appl. No.: 285,507

[22] Filed: Dec. 16, 1988

[51] Int. Cl.[4] .............................................. C08L 20/28
[52] U.S. Cl. .................................. 526/201; 526/219.3; 526/230; 526/230.5; 526/232; 526/328
[58] Field of Search ...................... 526/201, 219.3, 230, 526/230.5, 232, 328

[56] References Cited

U.S. PATENT DOCUMENTS

| | | | |
|---|---|---|---|
| 3,567,118 | 3/1971 | Shepherd et al. | 239/6 |
| 3,583,957 | 6/1971 | Chromecek et al. | 260/86.1 |
| 3,670,073 | 6/1972 | Shepherd et al. | 424/47 |
| 3,963,685 | 6/1976 | Abrahams | 526/230 |
| 3,988,305 | 10/1976 | Stol et al. | 526/79 |
| 4,076,921 | 2/1978 | Stol et al. | 526/89 |
| 4,563,184 | 1/1986 | Korol | 604/368 |
| 4,696,974 | 9/1987 | Sulc et al. | 525/92 |

FOREIGN PATENT DOCUMENTS 0024164  6/1980  European Pat. Off. .
0069371  1/1983  European Pat. Off. .
1403387 10/1972 United Kingdom .

Primary Examiner—Joseph L. Schofer
Assistant Examiner—Bernard Lipman
Attorney, Agent, or Firm—Mueller and Smith

[57] ABSTRACT

Disclosed is a method for preparing poly(2-hydroxyethyl methacrylate) polymers (PHEMA) by a precipitation/suspension polymerization technique wherein a reaction mixture comprising hydroxyethyl methacrylate monomer (HEMA), solvent, and a free-radical initiator is subjected to heating for a time adequate for said PHEMA to be formed. The improvement in process of the present invention comprises restricting said HEMA to contain less than about 0.5 wt-% polyfunctional acrylate content, incorporating a suspending agent in said reaction mixture, agitating said reaction mixture during said heating, and restricting said solvent to one having a solubility parameter of between about 7.5 and 9, to produce PHEMA polymer particles ranging in size from about 30 to 1,000 microns and having a molecular weight ranging from about 500,000 to 2,000,000.

16 Claims, No Drawings

PREPARATION OF PHEMA BY PRECIPITATION/SUSPENSION POLYMERIZATION

BACKGROUND OF THE INVENTION

The present invention relates to the preparation of a poly(2-hydroxyethyl methacrylate) polymer (hereinafter PHEMA) and more particularly to a new precipitation/suspension polymerization process for its preparation.

PHEMA and related acrylic polymers have been prepared by suspension polymerization and solution polymerization techniques. These polymers are typified by being organic solvent soluble and water insoluble. Such hydrophylic polymers are capable of generating a water-insoluble hydrogel. PHEMA in particular has exhibited special utility as a basis for preparation of a synthetic bandage or dressing which can be applied to burns and other wounds as proposed in U.S. Pats. Nos. 3,963,685 and 4,563,184.

Prior suspension polymerization proposals include U.S. Pat. No. 3,583,957 which shows the polymerization of PHEMA containing appreciable di-acrylate cross-linker (ethyleneglycol dimethacrylate) in an aromatic hydrocarbon solvent under conditions which exclude stirring to produce PHEMA polymer particles of less than about 10 microns in particle size. U.S. Pat. No. 4,076,921 (and corresponding UK Pat. No. 1,403,387) propose a similar no-stirring process to produce about 1 micron sized particles wherein the cross-linker level ranges from about 0.02 to about 0.2% by volume of the entire reaction mixture. Solvents include aromatic hydrocarbons, hydroaromatic hydrocarbons, halogenated derivatives of aliphatic or cycloaliphatic hydrocarbons, esters of carbonic acids and aliphatic alcohols, ethers and cycloethers, and ketones and cycloketones. U.S. Pat. No. 3,998,305 proposes yet another similar process of producing about one micron sized PHEMA polymer particles wherein the criticality of cross-linker is stated to be less than 0.2 vol-% by weight of the reaction mixture. U.S. Pat. No. 4,696,974 proposes yet another nostirring process utilizing toluene solvent wherein the crosslinker level ranges from about 1 to 3 percent by weight of the HEMA monomer fed to the process.

It should be noted that solution polymerization techniques also have been proposed in the art for production of HEMA polymer particles. Regardless of the technique employed in preparing the PHEMA polymer particles, the art describes the formation of wound dressings by the combining of the PHEMA product with a water-miscible organic solvent such as polyethylene glycol, and optionally a plasticizer. A uniform set of physical properties of the PHEMA polymer particles is not apparent in the art on this subject. Variance of the physical properties depending upon the intended use of the wound dressing including the drug employed would appear to impact the physical properties of candidate PHEMA particles for use in the medical wound dressing art.

BROAD STATEMENT OF THE INVENTION

The present invention defines characteristics of PHEMA polymer particles which should enable the skilled artisan to assemble various wound dressing formulations particularly tailored to identified needs, such as the drug to be used in the formulation, drug release rate desired, and like factors. Accordingly, the present invention is directed to a process for preparing PHEMA particles by precipitation/suspension polymerization wherein a reaction mixture comprising hydroxyethyl methacrylate (HEMA), an organic solvent (reaction medium), and a free-radical initiator, is subjected to heating for a time adequate for said PHEMA particles to be formed. The improvement in process of the present invention comprises restricting the HEMA to contain less than about 0.5 wt-% polyfunctional acrylate content, incorporating a suspending agent in said reaction mixture, agitating said reaction mixture during said heating, and restricting said solvent to one having a solubility parameter ($\delta$) of between about 7.5 and 9, to produce PHEMA particles ranging in size from about 30 to 1,000 microns and having a molecular weight ranging from about 500,000 to 2,000,000.

Advantages of the present invention include the good yields of PHEMA product which are made in accordance with the inventive process and the ability to synthesize a PHEMA product having a desirable physical properties. Another advantage is the facile recovery and purification of the particulate product by appropriate combinations of polymerization diluent, evaporation or distillation, gravity settling, centrifugation or filtration, and possible washing processes. Yet another advantage is the recovery of the product in a finely divided, free flowing, easily handled and transported powder form that does not require expensive and cumbersome grinding processes. These and other advantages will be readily apparent to those skilled in the art based upon the disclosure contained herein.

DETAILED DESCRIPTION OF THE INVENTION

The inventive process permits the reliable and reproducable production of PHEMA particles characterized by a defined particle size and molecular weight range. Additionally, it should be observed that the process permits gel content and tap (bulk) density characteristics of the PHEMA polymer particles to be defined also. Broadly, the inventive process accomplishes these results by controlling the cross-linker content of the HEMA reactant, by agitating the reaction mixture during the polymerization reaction, by including a suspending agent in the reaction mixture, and by uniquely defining reaction medium organic solvents having the ability to permit the reliable and reproducable production of PHEMA polymer particles having the physical charcteristics defined herein.

Referring initially to the solvent of choice for use in the process, the solvent is one having a solubility parameter of between about 7.5 and 9. The solubility parameter has been defined as the square root of the cohesive energy density which represents the concentration of forces which causes molecules to cohere. The heat of mixing of a solvent and a polymer is proportional to the square of the differences between the square roots of the cohesive energy density terms. The solubility of a polymer and a solvent will occur when the heat of mixing is small, or when the value of a solubility parameter for the polymer and solvent are similar. Further detailed calculations of solvent mixtures and application of the concept of solubility parameters can be found in Burrell, *Off. Dig. Federation Soc. Paint Technol.*, 27, 726 (1955). See also D.H. Soloman, *The Chemistry of Or-*

*ganic Film Formers*, Robert E. Kreiger Publishing Co., New York, N.Y., pp 32–33 (1977).

Those skilled in the art will appreciate that the difference is solubility parameter between the monomer being polymerized and the solvent actually is the controlling factor. Since a particular monomer reactant is being utilized in the inventive process, the solubility parameter solvent can be utilized for present purposes as correlative to the difference in solubility parameters noted above. Broadly, the solvent should possess a solubility parameter of between about 7.5 and 9. A variety of solvents, then, are appropriate for use in the polymerization process of the present invention. These solvents include, for example, esters such as cyclohexyl acetate, methyl propionate, methyl butyrate, n-propyl acetate, n-butyl acetate, ethyl butyrate, amyl acetate, hexyl acetate, iso-propyl acetate, ethyl propionate, iso-butyl acetate, octyl acetate, methyl isobutyrate, and t-butyl acetate; ketones such as 3-pentanone, 2-pentanone, methyl isobutyl ketone, and 2-hexanone; and aromatic solvents such as toluene. Interestingly, within the foregoing groups, there are, of course, solvents which do not function. For example, in the ketone solvent group, acetone and methyl ethyl ketone do not function. In the ester solvent group, for example, methyl acetate, and ethyl acetate do not function.

With respect to the HEMA reactant, it has been determined that the cross-linker content should be low. For present purposes, the cross-linker content, as typified by ethylene glycol dimethacrylate, should be less than about 0.5% by weight of the HEMA reactant and preferably below about 0.25 wt-%. The present polymerization process is a homopolymerization process with as little polymer cross-linking as possible occurring.

Suitable free-radical catalysts or initiators for use in the process include those typically used in the acrylic polymerization art including, for example, t-butyl peroctoate, benzoyl peroxide, isopropyl percarbonate, methyl ethyl ketone peroxide, azo-bis-isobutyronitrile, 2,2'-azobis(2,4-dimethylvaleronitrile), lauryl peroxide, 2,2'-azobis(2-methylbutyronitrile), and the like and mixtures thereof.

The polymerization process of the present invention is not strictly a precipitation process wherein the HEMA monomer dissolved in the solvent is polymerized to produce a PHEMA polymer product which is insoluble in the solvent and precipitates therefrom. Rather, the inventive process augments such conventional suspension polymerization technique by including a suspending agent or emulsifying agent, by agitating the reaction mixture, and by carefully selecting the reaction medium solvent for providing a controlled particle size and for precluding the PHEMA polymer particles (or agglomerates thereof) from precipitating from the reaction mixture. Thus, the process is termed a precipitation/suspension polymerization.

Suitable suspending agents for use in the process include, for example, polyglyceryl esters of fatty acids, ethylene oxide/propylene oxide block copolymers, higher aliphatic esters of sorbitol, mixed polyethylene oxide/higher aliphatic esters of sorbitol, octyl and nonyl phenol polyoxyethylene oxide ethers, higher aliphatic polymethacrylate oligomers, and the like and mixtures thereof. Suspending agents having HLB values of about 2–10 appear to be advantageous for use in the inventive process and especially food-grade suspending agents.

In practicing the present invention, HEMA reactant is incorporated into the solvent in a concentration of between about 2% and less than about 45% by weight. Between about 20 and 35 wt-% HEMA monomer has been found quite satisfactory for present purposes. The initial reaction mixture additionally contains an effective amount of a free radical catalyst which typically translates to about 0.5 to 1% by weight. Suspending agents also are introduced into the reaction mixture in an effective amount which typically ranges from about 1 to 5% by weight.

In practicing the present invention, conventional suspension polymerization conditions are maintained. Such conditions comprehend temperatures ranging from between about 0° and 100° C. with corresponding reaction times ranging from about 1 to 5 hours and the use of adequate mixing or agitation conditions to form and maintain, in the presence of a suspending agent, a stable, non-coalescing suspension of PHEMA polymer particles as the dissolved HEMA monomer polymerizes. Following the polymerization reaction, the PHEMA particles can be recovered from the reaction mixture by conventional techniques including distillation, centrifugation, filtration, and the like. Alternatively, the amount of solvent in the reaction mixture can be reduced, for example, by decantation or partial filtration. Additionally, the recovered PHEMA product can be sieved for selection of desired particle size fractions, ground, coalesced with aid of a coalescing agent, or other processing and/or combinations thereof.

The PHEMA polymer particles thus-produced broadly have a molecular weight of between about 500,000 and 2,000,000 and preferably between about 1 million and 1.5 million. Particle size distribution is affected by the intensity and type of agitation or stirring imparted to the reaction mixture during the polymerization process. The preferred broad range for the PHEMA particles of the present invention is between about 30 and 1,000 microns with about 44–105 microns being preferred. As noted above, PHEMA polymer particles are characterized as being solvent-soluble in a variety of solvents including methanol. The insoluble fraction is identified as the "gel content" of the reaction product. In the present invention, gel contents (in methanol) normally range from about 7.5 to 75 percent by weight with typical gel contents of about 10 to 40 percent by weight being encountered. Tap (bulk) density of the PHEMA polymer product typically ranges from about 0.25 to 0.5 g/cm$^3$. Preferred tap densities range from about 0.30 to about 0.45 g/cm$^3$. With the ability of the inventive polymerization process to define the physical properties within the broad ranges specified, the artisan is provided a PHEMA polymer product which is an ideal candidate for formulating a wide variety of products, including medical wound dressings. In this regard, a variety of medicinally-active ingredients have been proposed in the art for incorporation into synthetic resin wound dressings, including germicides, fungicides, antibiotics, analgesics, and the like, and mixtures thereof. The art discussed herein can be consulted for more details in this regard.

The following examples show how the present invention has been practiced, but should not be construed as limiting. In this application, all percentages and proportions are by weight and all units are in the metric system, unless otherwise expressly indicated. Also, all citations to herein are expressly incorporated herein by reference.

EXAMPLES
EXAMPLE 1

A series of runs was undertaken to evaluate various solvents as a polymerization vehicle for the precipitation/suspension polymerization of 2-hydroxyethyl methacrylate. The following reaction formulation and conditions were used:

TABLE 1

| Reactants* | Amt. |
| --- | --- |
| HEMA | 10 ml |
| Solvent | 40 ml |
| Pluronic L62D | 0.50 g |
| Vazo 52 | 0.05 g |
| Reaction Temp. | 60° C. |
| Reaction Time | 5 hrs. |

*Pluronic L62 suspending agent: ethylene oxide/propylene oxide block copolymer, BASF Wyandotte Corporation, Parsippany, New Jersey.
Vazo 52 initiator: 2,2'-azobis(2,4-dimethylvaleronitrile), E. I. DuPont de Nemours and Co., Wilmington, Delaware.
HEMA: Sipomer CL100 hydroxyethylmethacrylate, ethylene glycol dimethacrylate specification of 0.2 wt % maximum, Alcolac, Baltimore, Md.

The solvents tested and the results recorded are set forth below:

The above-tabulated results establish that several different types of solvents are suitable polymerization media for producing PHEMA particles conforming to the desired physical properties disclosed herein. Interesting, solubility parameter is shown to be an important indicia for the solvent.

EXAMPLE 2

The procedure of Example 1 was repeated for a series of acetate solvents using a different suspending agent Santone 10-10-0 (decaglycerol decaoleate, saponification No. 165-180, OH No. 25-45, acid value 6.0 max, I.V. 65-80, HLB of 20, Durkee Foods, SCM Corporation, Cleveland, Ohio). The following results were recorded:

TABLE 2

| Sample Number 43030- | Solvent | Solubility Parameter ($\delta$) $(cal/cm^3)^{\frac{1}{2}}$ | Particle[a] size, (microns) | Tap[b] Density, (g/cc) | Gel[c] Content, (wt %) | Molecular[d] Weight × $10^6$ |
| --- | --- | --- | --- | --- | --- | --- |
| 42-6 | Acetone | 9.9 | — | — | — | not isolated[h] |
| 83-3 | Cyclohexanone[f] | 9.9 | — | — | — | — |
| 84-1 | Methyl acetate | 9.6 | Agglomerate[j] | 0.31 | 41 | Hazy highly swollen gel |
| 86-2 | 2-Ethyl hexanol | 9.5 | Agglomerate[j] | 0.36 | 48 | Hazy viscous solution: >> 1.6 |
| 42-5 | Methyl ethyl ketone | 9.3 | — | — | — | not isolated[h] |
| 84-2 | Ethyl acetate | 9.1 | Agglomerate[j] | 0.32 | 44 | Hazy mobile swollen gel |
| 84-7 | Cyclohexyl acetate[i] | 9.0 | 67 | 0.32 | 34 | Clear solution, some gel; >>1.6 |
| 86-6 | Toluene | 8.9 | 90–190 | 0.37 | 30 | Hazy solution containing gel as clumps |
| 85-1 | Methyl propionate | 8.9 | 300 | 0.32 | 31 | Clear solution, some gel; >>1.6 |
| 85-3 | Methyl butyrate | 8.9 | 139 | 0.32 | 33 | 1.15 |
| 42-3 | 3-Pentanone | 8.8 | 210–650 | —[f] | 15 | 1.48 |
| 84-4 | n-Propyl acetate | 8.8 | 103 | 0.31 | 26 | Hazy solution, some gel; >1.6 |
| 42-4 | 2-Pentanone | 8.7 | 100–400 | —[f] | 38 | Hazy highly swollen gel |
| 84-3 | n-Butyl acetate | 8.5 | 154 | 0.32 | 29 | Hazy solution, some gel; 1.7 |
| 85-4 | Ethyl butyrate | 8.5 | 84 | 0.32 | 32 | Clear solution, some gel; >>1.6 |
| 23-5 | Amyl acetate | 8.5 | 31 | 0.29 | 22 | 1.42 |
| 23-6 | Hexyl acetate[i] | 8.5 | 59 | 0.30 | 27 | >1.60 |
| 84-5 | iso-Propyl acetate | 8.4 | 108 | 0.32 | 26 | Hazy solution, some gel; >1.6 |
| 85-2 | Ethyl propionate | 8.4 | 141 | 0.33 | 16 | 0.79 |
| 86-4 | Methyl isobutyl ketone | 8.4 | 43 | 0.38 | 12 | <0.79[g] |
| 23-7 | Octyl acetate[i] | 8.4 | 88 | 0.32 | 47 | Mobile swollen gel |
| 23-3 | iso-Butyl acetate | 8.3 | 46 | 0.29 | 17 | 1.30 |
| 42-2 | 2-Hexanone | 8.3 | 157 | 0.35 | 31 | Clear viscous solution; >>1.6 |
| 85-5 | Methyl isobutyrate | 8.3 | 131 | 0.34 | 19 | 0.96 |
| 23-4 | t-Butyl acetate[i] | 8.0 | 74 | 0.33 | 23 | 1.60 |
| 86-5 | Hexane[f] | 7.3 | — | — | 42 | — |

[a]Estimated by microscopy.
[b]Measured in a 10 ml graduated cylinder, tapped on counter until no further compaction was observed.
[c]Material not soluble in methanol determined from material loss from filtration of PHEMA solution.
[d]Molecular weight determined by Gardner Viscosity method (1.5 g PHEMA in 20 ml 2-methoxyethanol, compare relative viscosity of sample to that of standard PHEMA of 1 · $10^6$ 1.6 · $10^6$ MW)
[e]No product.
[f]Not a particulate product, contains chunks.
[g]Close to, but less than, 790,000 based on viscosity.
[h]Polymer plated walls; not a precipitation polymerization.
[i]Calculated solubility parameters.
[j]Agglomerate content rendered product unsuitable. Particle size and other values are for the particle content of the agglomerate/particle product mixture.

TABLE 3

| Sample Number 43030- | Solvent | Solubility Parameter (δ) (cal/cm³)^½ | Particle[a] size, (microns) | Tap[b] Density, (g/cc) | Gel[c] Content, (wt %) | Molecular[d] Weight × 10^6 |
|---|---|---|---|---|---|---|
| 26-1 | Ethyl acetate | 9.1 | Agglomerate | 0.20 | 30 | Highly swollen gel |
| 26-2 | n-Butyl acetate | 8.5 | 103 | 0.32 | 18 | 1.21 |
| 26-3 | iso-Butyl acetate | 8.3 | 91 | 0.32 | 17 | 1.33 |
| 26-4 | t-Butyl acetate | 8.0 | 91 | 0.32 | 24 | 1.60 |
| 26-5 | Amyl acetate | 8.5 | 81 | 0.32 | 21 | 1.58 |
| 26-6 | Hexyl acetate | 8.5 | 68 | 0.32 | 24 | >1.60 |
| 26-7 | Octyl acetate | 8.4 | 126 | 0.33 | 40 | Mobile swollen gel |

[a]Estimated by microscopy.
[b]Measured in a 10 ml graduated cylinder, tapped on counter until no further compaction was observed
[c]Material not soluble in methanol determined from the material loss from filtration of PHEMA solution.
[d]Molecular weight determined by Gardner Viscosity method (1.5 g PHEMA in 20 ml 2-methoxyethanol, compare relative viscosity of sample to that of standard PHEMA of 1 × 10^6 –1.6 × 10^6 MW)

EXAMPLE 3

Utilizing n-butyl acetate solvent in a formulation as set forth in Example 1, several alternative suspending agents were evaluated in addition to the suspending agents used in Examples 1 and 2. The following results were recorded:

TABLE 4

| Sample Number 43030- | Suspending Agent | Particle[a] size, (microns) | Tap[b] Density, (g/cc) | Gel[c] Content, (wt %) | Molecular[d] Weight × 10^6 |
|---|---|---|---|---|---|
| 29-6 | Caprol 10G10-0 (decaglycerol decaoleate, Capitol City Products Co., Columbus, Ohio) | 100 | 0.33 | 38 | <<0.79 |
| 29-7 | Caprol PGE 860 (decaglycerol mono/dioleate, Capital City Products Co.) | 185 | 0.38 | 33 | 1.67 |
| 29-8 | Caprol JB (decaglycerol decastearate, Capital City Products Co.) | 103 | 0.34 | 32 | Cloudy viscous solution, >> 1.6 |
| 37-1 | Span 80/Tween 80 (Sorbitan monooleate/polyoxymethylene sorbitan monooleate, ICI Americas) | 112 | 0.32 | 24 | 1.38 |
| 37-2 | Span 80 (Sorbitan monooleate, ICI Americas) | 102 | 0.29 | 31 | Clear viscous solution, >>1.6 |
| 37-3 | Tween 80 (Polyoxymethylene sorbitan monooleate, ICI Americas) | 101 | 0.32 | 23 | 1.38 |
| 37-4 | Triton X15 (Octylphenoxy polyethoxyethanol, ICI Americas) | 80 | 0.33 | 27 | 1.47 |
| 37-5 | Solsperse 13345 (now Hypermer LP7, a NAD type proprietary stabilizer, ICI Americas) | 82 | 0.36 | 33 | Clear swollen, mobile gel |
| 37-6 | Gantrez ES425 (Low molecular weight polymer with pendant half-esters of maleic anhydride, GAF Corp.) | 41 | 0.30 | 32 | Clear swollen mobile gel |
| 38-1 | Stabilizer B (a NAD type proprietary stabilizer, Battelle Columbus Labs) | 61 | 0.29 | 65 | Clear swollen, mobile gel |
| 38-2 | Polyvinyl-pyrrolidone (K-15, molecular weight of 15,000 GAF Corp.) | 92 | 0.31 | 40 | Hazy solution, >>1.6 |
| 38-3 | Poly(isobutylmethacrylate) (estimated molecular weight of 25,000–50,000) | 110 | 0.30 | 29 | Hazy solution, >>1.6 |
| 38-4 | Poly(isobornylmethacrylate) (estimated molecular weight of 25,000–50,000) | 97 | 0.31 | 27 | 1.60 |

[a]Estimated by Microscopy
[b]Measured in a 10 ml graduated cylinder, tapped on counter until no further compaction was observed.
[c]Material not soluble in methanol determined from material loss from filtration of PHEMA solution.
[d]Molecular weight determined by Gardner Viscosity method (1.5 g PHEMA in 20 ml 2-methoxyethanol, compare relative viscosity of sample to that of standard PHEMA of 1 × 10^6 –1.6 × 10^6 MW)

The above-tabulated results demonstrate that acrylic polymerization processing results are dependent upon the choice of suspending agent. Based upon the foregoing results, it appears that structural features of the suspending agents are more important than HLB value. Still, several conventional suspending agents appear to be efficacious in the process.

EXAMPLE 4

In the previous examples, the proportion of HEMA reactant was 20 vol-%. In this example, the HEMA monomer level was varied in n-butyl acetate solvent in a formulation like that set forth in Example 1, except that the proportion of Pluronic L-62D suspending agent was 0.25 g. The following results were recorded:

TABLE 5

| Sample Number | HEMA (Volume %) | Particle[a] size, | Tap[b] Density, (microns) | Gel[c] Content, (g/cc) | Molecular[d] Weight (wt %) × 10^6 |
|---|---|---|---|---|---|
| 43030-63-3 | 20[e] | 52 | 0.31 | 29 | 1.07 |
| 43717-3-1 | 30[f] | 40-agglomerate | 0.37 | 36 | 1.63 |
| 43717-3-2 | 40[g] | 250-500 | 0.42 | 51 | Highly swollen gel |

[a] Estimated by microscopy.
[b] Measured in a 10 ml graduated cylinder, tapped on counter until no further compaction is observed.
[c] Material not soluble in methanol determined from material loss from filtration of PHEMA solution.
[d] Molecular weight determined by Gardner Viscosity method (1.5 g PHEMA in 20 ml 2-methoxyethanol, compare relative viscosity of a sample to that of standard PHEMA of 1 × 10^6 –1.6 × 10^6 MW)
[e] Good suspension of product.
[f] Fair to good suspension of product with some deposit on polymer walls.
[g] Product completely agglomerated on bottle walls.

The above-tabulated results show that a limitation on the reactant monomer level in the process does exist. Additional work showed, however, that incremental additions of HEMA reactant was possible, though the first monomer charge apparently did not serve as a nucleation site for agglomeration or densification of the PHEMA polymer product. The incremental addition, however, appears to indicate that a total solids content of about 30–50% should be attainable with scaleup of the process.

EXAMPLE 5

The following scale-up formulation batches were prepared:

TABLE 6

| Reactants | Batch A | Batch B |
|---|---|---|
| HEMA | 200 ml | 800 ml |
| n-butyl acetate solvent | 50 ml | 200 ml |
| Santone 10-10-0 | 2.5 g | 10.0 g |
| Vazo 52 | 0.25 g | 1.0 g |
| Reaction temperature | 60° C. | 60° C. |
| Reaction time | 5 hrs | 5 hrs |
| Vessel size | 500 ml | 3000 ml |

Each vessel was fitted with an overheat stirrer for agitation of the reaction mixture. The following results were recorded:

TABLE 7

| Sample Number 43717 | Batch | Stirring Rate (rpm) | Particle[a] size (microns) | Tap[b] Density (g/cc) | Gel[c] Content (wt %) | Molecular[d] Weight × 10^6 |
|---|---|---|---|---|---|---|
| 15 | A | 160 | 100–780 | 0.31 | 17 | 0.79 |
| 18 | B | 160 | 120–1400 | 0.29 | 9 | 1.30 |
| 22 | B | 160/250[e] | 100–1200 | 0.28 | 24 | 1.33 |

[a] Estimated by microscopy.
[b] Measured in a 10 ml graduated cylinder, tapped on counter until no further compaction was observed.
[c] Material not soluble in methanol determined from material loss from filtration of PHEMA solution.
[d] Molecular weight determined by Gardner Viscosity method (1.5 g PHEMA in 20 ml 2-methoxyethanol, compare relative viscosity of sample to that of standard PHEMA of 1 · 10^6 –1.6 · 10^6 MW)
[e] Initial 160 rpm (revolutions per minute) stirring rate increased to 250 rpm after PHEMA particles formed.

The foregoing results show that the stirring rate and the flask size affect the molecular weight and gel content of the PHEMA polymer product. The degree of turbulence or energy input into the reaction results from the vessel size and stirring rate variances and is the underlying cause of the different physical properties recorded in the data. This affect also has been seen in other runs. Thus, for predictability and uniformity of PHEMA polymer particle product, energy input in the reaction mixture (vessel size, vessel shape, baffles, stirring rate, method of stirring, etc.) need to be ascertained and held constant in commercial implementation of the inventive process.

We claim:

1. In a method for preparing poly(hydroxyethyl methacrylate) (PHEMA) particles by precipitation/suspension polymerization wherein a reaction mixture comprising hydroxyethyl methacrylate (HEMA), a solvent, and a freeradical initiator is subjected to heating for a time adequate for said PHEMA particles to be formed, the improvement which comprises: restricting said HEMA to contain less than about 0.5 wt-% polyfunctional acrylate content, incorporating an effective amount of a suspending agent in said reaction mixture, agitating said reaction mixture during said heating, and restricting said solvent to one having a solubility parameter of between about 7.5 and 9, to produce PHEMA particles ranging in size from about 30 to 1,000 microns and having a molecular weight ranging from about 500,000 to 2,000,000.

2. The method of claim 1 wherein said PHEMA polymer ranges in particle size from about 44 to 105 microns.

3. The method of claim 1 wherein said molecular weight of PHEMA particles ranges from between about 1,000,000 and 1,500,000.

4. The method of claim 1 wherein said PHEMA particles produced have a gel content ranging from between about 7.5 and 75 percent by weight.

5. The method of claim 4 wherein said gel content ranges from between about 10% and 40% by weight.

6. The method of claim 1 wherein the PHEMA particles produced have a bulk density of between about 0.25 and 0.5 g/cc.

7. The method of claim 6 wherein said bulk density ranges from about 0.3 to 0.45 g/cc.

8. The method of claim 1 wherein the proportion of HEMA contained in said reaction mixture ranges from between about 2 to less than 45 percent by weight.

9. The method of claim 8 wherein the concentration of said HEMA ranges from between about 20 and 35 percent by weight of said reaction mixture.

10. The method of claim 1 wherein the effective amount of said suspending agent ranges from between about 1 and 5 percent by weight.

11. The method of claim 1 wherein the proportion of free radical initiator ranges from between about 0.5 and 1 percent by weight.

12. The method of claim 1 wherein said solvent is selected from the group consisting of cyclohexyl acetate, methyl propionate, methyl butyrate, n-propyl acetate, n-butyl acetate, ethyl butyrate, amyl acetate, hexyl acetate, isopropyl acetate, ethyl propionate, isobutyl acetate, octyl acetate, methyl isobutyrate, t-butyl acetate, 3-pentanone, 2-pentanone, methyl isobutyl ketone, 2-hexanone, and toluene.

13. The method of claim 1 wherein said heating ranges from a temperature of between about 0° to 100° C. for a time ranging from between about 1 and 5 hours.

14. The method of claim 1 wherein said initiator is t-butyl peroctoate, benzoyl peroxide, isopropyl percarbonate, methyl ethyl ketone peroxide, azo-bis-isobutyronitrile, 2,2'-azobis(2,4-dimethylvaleronitrile), lauryl peroxide, 2,2-azobis(2methylbutyronitrile), and mixtures thereof.

15. The method of claim 1 wherein said suspending agent is selected from the group consisting of polyglyceryl esters of fatty acids, ethylene oxide/propylene oxide block copolymers, higher aliphatic esters of sorbitol, mixed polyethylene oxide/higher aliphatic esters of sorbitol, octyl or nonyl phenol polyoxyethylene oxide ethers, higher aliphatic polymethacrylate oligomers, and mixtures thereof.

16. The method of claim 1 wherein said PHEMA polymer particles are recovered from said reaction mixture.

* * * * *